Jan. 15, 1952     E. H. LORENZ     2,582,494
GLASSWARE INSPECTING MACHINE
Filed Aug. 1, 1946     3 Sheets—Sheet 1

INVENTOR
EDWARD H. LORENZ
BY Parham + Bates
ATTORNEYS

Jan. 15, 1952  E. H. LORENZ  2,582,494
GLASSWARE INSPECTING MACHINE
Filed Aug. 1, 1946  3 Sheets-Sheet 2

INVENTOR
EDWARD H. LORENZ
BY Parham + Bates
ATTORNEYS

Jan. 15, 1952  E. H. LORENZ  2,582,494
GLASSWARE INSPECTING MACHINE
Filed Aug. 1, 1946  3 Sheets-Sheet 3

INVENTOR
EDWARD H. LORENZ
BY Parham + Bates
ATTORNEYS

Patented Jan. 15, 1952

2,582,494

UNITED STATES PATENT OFFICE 2,582,494

GLASSWARE INSPECTING MACHINE

Edward H. Lorenz, West Hartford, Conn., assignor to Emhart Manufacturing Company, a corporation of Delaware Application August 1, 1946, Serial No. 687,799

5 Claims. (Cl. 209—88)

The invention relates to improvements in machines for inspecting glass containers to ascertain the presence or absence of particular defects and for separating those having such defects from the other inspected containers.

An object of the invention is to provide a glassware inspecting machine which includes means for detecting "spikes" on the bottoms of glass containers, such as jars, and for delivering at a reject station each container in which a spike has been detected.

The term "spike" refers to a pointed projection, thread, blister, or other upward glass projection on the bottom of a glass container, such as a jar. Spikes occur infrequently in the production of glass containers but, nevertheless, constitute a serious problem for several reasons. First, being composed of the glass of which the container is made, they are difficult to detect by visual inspection. If undetected, they may break off when the container is in use and become mixed with the contents thereof. This, of course, is a serious matter, particularly if the container is used for food products. Second, spikes usually are caused by some defect in the machinery by which the containers are being made or in its operation, as by the use of an unduly hot or "sticky" plunger in pressing contact with a glass charge or parison that is being formed into the glass container. When such a defect exists in the equipment by which containers are being made or in the operation thereof, it is important to ascertain this fact as early as possible so that the defect may be remedied and the production of defective glass articles kept as low as possible. Such a defect may not be ascertainable except as the source of a defect in the ware produced.

A further object of the invention is to provide an inspecting machine which is adapted to receive in its turn each of a series of glass jars or the like and to subject each such article to inspection to detect any spike therein and also to further inspection to detect a different particular defect therein, such, for example, as a check in the rim or finish portion thereof, and to separate out from the other inspected articles each inspected article that has been found to have either of such defects.

A more specific object of the invention is to provide a glass container inspecting machine of the character just described in which independent inspection devices are provided to inspect each article handled by the machine for a spike and for a finish or rim check, respectively, and in which a normally inactive, reject mechanism is provided and is operatively connected with both such inspection devices so as to eject from the machine at a reject station each such article that has been found on inspection to have either of the particular defects referred to.

A further object of the invention is to provide a glassware inspecting machine of the character described in which a plurality of photoelectric cell units are included in the control mechanism of the article reject mechanism of the machine so that operation of the reject mechanism may be effected by energization of any one of such photoelectric cell units.

A further object of the invention is to provide a glassware inspecting machine of the character described in which the mechanism for inspecting the successive glass containers for spikes on the bottoms thereof can be adjusted to inspect glass articles of different descriptions, particularly those having bottoms of different thicknesses.

Other objects of the invention reside in the provision of advantageous structural and operating features of a reliable and efficient automatic machine of the character described. This will hereinafter be more particularly pointed out or will become apparent from the following description of a practical embodiment of the invention as shown in the accompanying drawings, in which.

Figure 1:
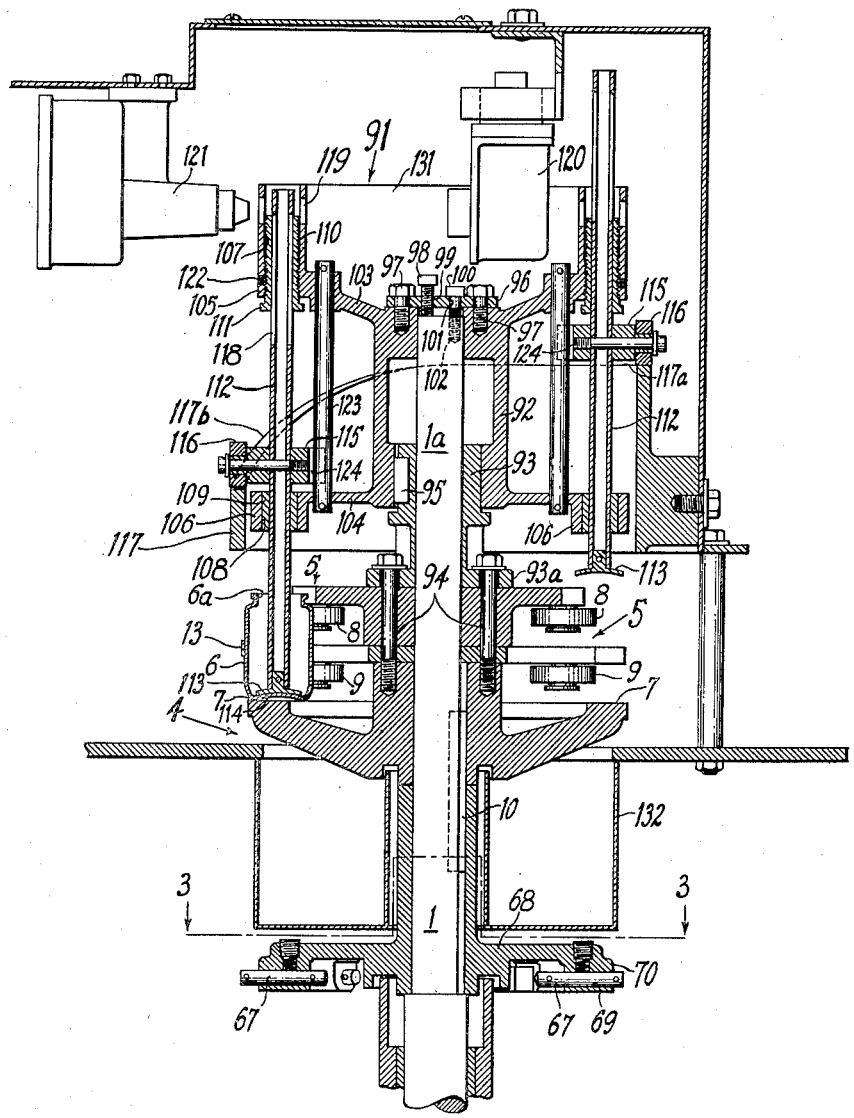
Fig. 1 is a vertical section through a portion of an illustrative machine, showing a rotary carrier for the glass jars to be inspected and a rotary carrier of movable feelers for detecting spikes on the bottoms of such jars, together with photoelectric means cooperatively associated with the feelers and a rotary carrier of the movable actuating pins of the reject mechanism of the machine.
Figure 3:
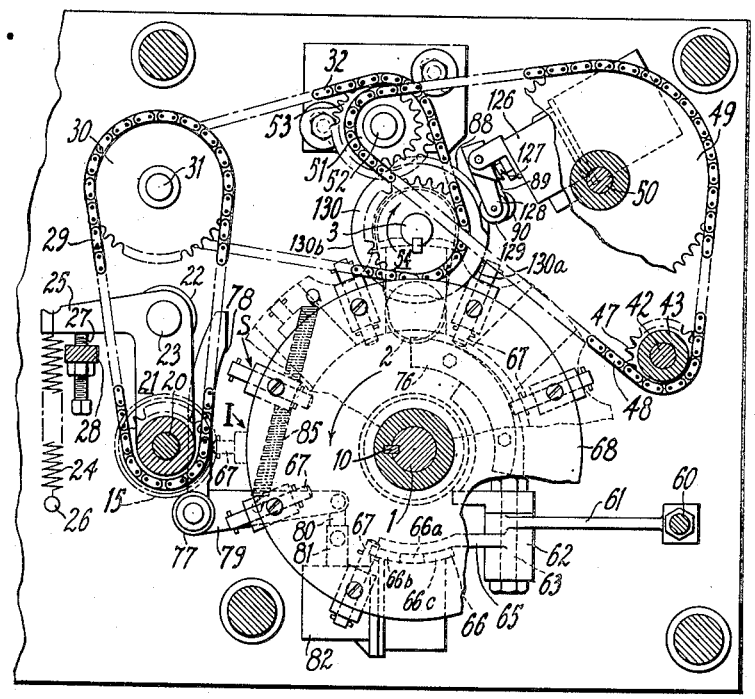
Fig. 3 is a transverse section of the machine on approximately the line 3—3 of Fig. 1, some of the parts which otherwise would appear in this view being omitted and others being partially broken away.

Referring to the drawings, the numeral 1, Figs. 1 and 3, designates a vertically disposed, vertical shaft which constitutes the main supporting and operating shaft of the machine. This shaft may be operatively supported for rotation about its vertical axis by any suitable means, as, for example, by means similar to that employed to rotatably support the main shaft of the gauging machine shown in my prior application, Serial No. 665,599, filed April 27, 1946. The shaft 1 may be rotated intermittently, as by a Geneva driven connection, indicated generally at 2, Fig. 3, with a continuously rotating, vertically disposed final drive shaft 3. The latter may be driven continuously by any suitable power means, as, for example, by means similar to that disclosed in my aforesaid application, Serial No. 665,599. The arrangement may be such as to turn the shaft 1 intermittently about its axis, as in a counterclockwise direction as indicated by the arrows in Figs. 2 and 3, this for purposes to be presently explained.

The vertical main shaft 1 carries a turret comprising a rotary carrier, generally designated 4, Fig. 1, for the articles of glassware to be inspected. The carrier 4 is constructed to provide a series of regularly spaced pockets, indicated at 5, Figs. 1 and 2, in its periphery. Each such pocket is open at the periphery of the carrier 4 to permit lateral movement of an article of glassware, such as a jar 6, into and out of the pocket at appropriate times in the operation of the machine. When in a pocket 5, the bottom of the jar 6 stands upon a portion 7 of the carrier that constitutes the bottom of that pocket, as indicated by the showing of the jar 6 in a pocket 5 in the left-hand portion of the carrier in Fig. 1, and as also is apparent from Fig. 2. A pair of horizontally spaced upper jar positioning elements, specifically rollers 8, project laterally into each pocket 5 near the upper part thereof from opposite sides of that pocket for contact with an upper portion of the body of the jar when the latter is fully within the pocket. Positioning of a jar in its pocket may be aided by a pair of horizontally spaced lower jar positioning elements, which also may be rollers, one of each of two pairs which respectively are provided for diametrically opposite pockets being shown at 9 in Fig. 1.

Figure 2:
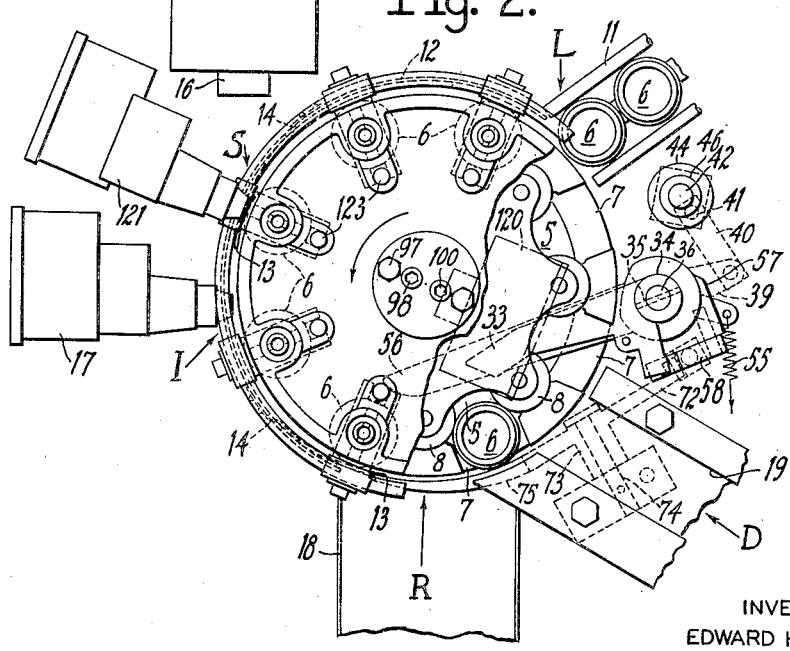
Fig. 2 is a plan view of the machine, showing some of the cooperative rotary and stationary structural parts and associate mechanisms, some of which are partially broken away to reveal underlying structures.

The carrier 4 is fastened to the shaft 1, as by the key 10, Fig. 1, to be rotated intermittently by the shaft. The driving of the shaft 1 from the continuously rotating shaft 3 is of such a character as to turn the carrier 4 about the axis of the shaft 1 so that each pocket 5 will be presented in turn at each of a plurality of angularly spaced stations which respectively are located around the periphery of the article carrier. One of these stations, indicated at L in Fig. 2, is a loading station at which a loading mechanism, a runway portion of which is indicated at 11, may be provided to feed an article 6 into each pocket 5 while that pocket is halted at the loading station by a dwell between successive intermittent rotary movements of the carrier. The loading mechanism may be substantially as disclosed in my aforesaid application, Serial No. 665,599. A guard rail, indicated at 12, Fig. 2, may be provided around a portion of the rotary carrier 4 to prevent accidental outward displacement of the articles 6 from their pockets during part of a cycle of rotation of the carrier from the loading station L. Spring pressers 13, Figs. 1 and 2, may be provided to press against the body of the jar in each pocket 5 at predetermined places along its path of movement around the axis of rotation of the carrier 4, this for a purpose to be hereinafter pointed out. These spring pressers may be strips or leaves of spring metal, each mounted at one end in the guard rail 12, as indicated at 14 in Fig. 2, so that the opposite end portion thereof is free to press laterally against the jar in a pocket at a particular position or they might be operatively supported in any suitable known way.

The intermittent rotary movements of the carrier 4 will move each of the pockets 5 angularly a distance equal to the distance between adjacent pockets. The stations referred to are appropriately located so that each pocket will be presented at each of such stations in turn during each cycle of rotation of the carrier 4.

An inspection station, indicated at I, Figs. 2 and 3, is subsequent to the loading station L. When a pocket is at the station I, the jar 6 in that pocket may be contacted by a rotating roller 15, Fig. 3, and turned in its pocket about its vertical axis. A beam of light from a light source 16, Fig. 2, may be projected onto the finish or the rim portion of the rotating jar at the inspection station I. Should a check be present in the finish or rim portion of the jar, light from the source 16 will be reflected by the wall of the check into a photoelectric cell unit 17. Suitable means, hereinafter more particularly described, may be activated by the energized photoelectric cell unit 17 to set in motion a series of operations to effect ejection of the article containing the check from its pocket when that pocket arrives at a reject station, indicated at R in Fig. 2. Light from the source 16 will pass through the rim or finish portion of the jar without being reflected into the photoelectric cell unit unless such light strikes a check in such rim or finish portion. In that event, the inspected jar may be carried past the reject station R to a delivery station, indicated at D, Fig. 2, and discharged from the carrier at that place. A chute, designated 18, is shown in part at the reject station R and a glass-article receiver or chute 19 likewise is shown in part at the delivery station D, Fig. 2.

The roller 15 for contacting and turning each jar 6 in its pocket at the inspection station I may be carried on a vertical shaft or stud 20, Fig. 3, mounted on an arm 21 of a bell crank lever 22 which is pivotally mounted on a short, vertical shaft 23. A tension coil spring 24 connects the other arm, indicated at 25, of the bell crank lever with a fixed anchoring member 26 and urges the roller 15 inwardly against the jar in the pocket of the carrier at the inspection station. An adjustable stop 27, carried by a fixed support 28 limits the spring-actuated swinging movement of the bell crank lever 22 and hence the extent of the bodily movement of the roller 15 toward the jar in the carrier pocket at the inspection station I. Rotation of the roller 15 may be effected through a chain drive, indicated at 29, this drive being from a sprocket 30 on a vertical shaft 31. The shaft 31 may be turned by a chain-and-sprocket driven connection with the continuously rotating shaft 3, the chain of this connection being indicated at 32 in Fig. 3. The mechanism for supporting and operating the roller 15 may be substantially as disclosed in my aforesaid application, Serial No. 665,599.

Figure 4:
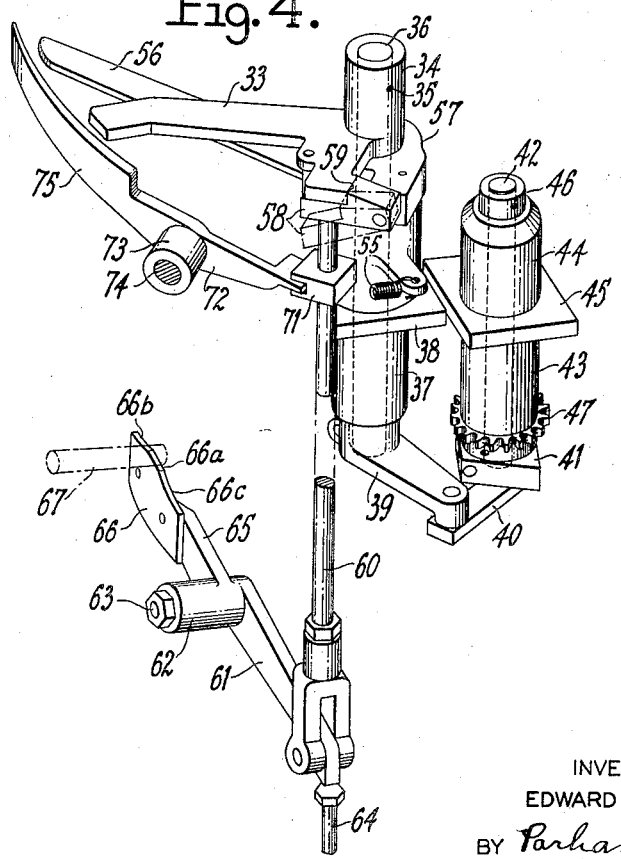
Fig. 4 is a detailed view in perspective of parts of the reject mechanism of the machine.

The mechanism for effecting removal of jars at the delivery station D comprises a horizontally swingable wiper arm 33, Figs. 3 and 4, having a hub portion 34 fastened at 35 to a vertical shaft 36. The vertical shaft 36 is journaled in a bearing 37, Fig. 4, carried by a stationary frame member, indicated at 38. An arm 39 extends laterally from the lower portion of the shaft 36 and is connected by a link 40, Figs. 2 and 4, with a crank 41 on the lower end of a vertical shaft 42. The shaft 42 is journaled in a long vertical bearing comprising a lower portion 43 and an upper portion 44 respectively below and above a stationary supporting member 45. A collar 46 which may be fastened on the upper portion of the shaft 42 so as to rest upon the bearing portion 44 may be employed to prevent downward displacement of the shaft 42 from its bearing. The shaft 42 carries a sprocket 47, Figs. 3 and 4, driven by an endless chain 48 which is trained about the sprocket 47, a sprocket 49 on a vertical shaft 50, and about a sprocket 51 on a vertical shaft 52, as shown in Fig. 3. The chain 32 hereinbefore referred to engages a sprocket 53 on the shaft 52 and also a sprocket 54 on the continuously rotating final drive shaft 3. The arrangement is such that the wiper arm 33, the location of which with relation to the delivery station D is shown in Fig. 2, is given a working stroke to push an article from the pocket 5 at the delivery station D at the end of each of the intermittent rotary movements of the carrier 4.

A spring 55, Figs. 2 and 4, tends to return a wiper arm 56 to its inwardly retracted position after outward or working stroke thereof. The wiper arm 56 is longer than the arm 33 and is mounted loosely on the shaft 36. The hub portion, designated 57, of this wiper arm, carries a vertically swingable pivoted latch 58. This latch, when in its raised position as shown by full lines in Fig. 4, engages an abutment or lug 59 on the hub 34 of the wiper arm 33 so that each working stroke of the wiper arm 33 will then cause a like or working stroke of the longer wiper arm 56. When the latch 58 is in its downwardly swung, inactive position, as shown by the dotted lines in Fig. 4, the longer wiper arm 56 will be unaffected and will remain in its inactive position during the working stroke of the wiper arm 33.

The latch 58 may be raised to its latching position by a vertically movable lifter rod 60 on the outer end of an arm 61 of a bell crank lever 62, Figs. 3 and 4. This bell crank lever is mounted on a horizontal pivot element 63 so that the outer end of the arm 61 rests on a stop 64, Fig. 4, when the lifter rod 60 is in its lowered position. A second arm, indicated at 65, Figs. 3 and 4, of the bell crank lever 62 carries a cam strip 66, the upper surface of which is formed to provide a raised intermediate portion 66a and downwardly inclined end portions 66b and 66c, respectively.

The bell crank lever 62 may be actuated by any one of a series of radially movable, radial pins 67, Figs. 1, 3 and 4, which are carried by a rotary carrier plate 68, Figs. 1 and 3, that is fastened to the main shaft 1, as by a portion of the key 10, as best seen in Fig. 1. Each of these pins 67 is mounted in a radial slide opening 69 in a depending flange or skirt 70 on the carrier 68. The pins 67 correspond in number and relative arrangement with the pockets 5 in the carrier 4. Each pin 67 may be given limited radial movement in its slide opening so that it may occupy an outwardly projecting position, as shown for the left-hand pin 67 in Fig. 1 or an inwardly retracted position, as shown for the right-hand pin 67 in the same view. When a pin 67 is in its inwardly retracted position, it will contact the inclined outer end portion 66b of the cam portion 66 of the bell crank lever 62 and slide thereon to the higher portion 66a of that cam, thereby depressing the lever arm 65 and raising the lifter rod 60. This will cause upward swinging movement of the latch 58 from the dotted-line position of Fig. 4 to the full-line position of the same view. This same movement of the lifter rod will carry upward a block 71 which is engaged with an end portion of an arm 72 of a bell crank lever 73 which is mounted on a horizontal shaft element 74, Figs. 2 and 4. Another arm, indicated at 75, of the bell crank lever 73 constitutes a vertically swingable gate for a break in the guard rail around the carrier 4 at the reject station R. Thus, when the wiper arm 56 has been latched to the intermittently oscillated wiper arm 33, the gate 75 will be lowered from its raised, article-obstructing position, Fig. 2, to permit an article to be pushed outwardly from its pocket over the edge of the carrier 4 into the chute 18 at the reject station.

The pins 67 are returned radially outward to their inactive positions by a cam 76, Fig. 3, during part of the cycle of rotation of the pin carrier 68 about the axis of the main shaft 1. When in their outwardly projected position, the inner ends of the pins 67 will clear the cam portion 66 of the pivoted latch-raising lever so that such pivoted latch may remain in its lowered, inactive position. However, should rejection of an article 6 be required because of the detection of a particular defect in that article, the pin 67 corresponding to the pocket 5 in which the defective inspected article is located will be moved radially inward to position to actuate the latch-lifting mechanism in the manner described. This pre-setting of the pin 67 may be effected in the manner and by the mechanism now to be described. A bell crank lever 77, Fig. 3, has one arm, indicated at 78, extending past the outer end of the pin 67 at the inspection station I and another arm, designated 79, connected by a link 80 with the plunger 81 of a solenoid 82. When the photoelectric cell unit 17 has received light from a check onto which a beam of light from the source 16 was focused at the inspection station I, as before described, an electric circuit to the solenoid 82 will be set up through an amplifying mechanism 83 and a junction box and relay mechanism 84, Fig. 5. As a consequence, the bell crank lever 77 will be operated by the solenoid against the action of a coil spring 85, Fig. 3, which normally holds the bell crank 77 in its inactive position. The solenoid-actuated movement of the bell crank 77 will cause the arm 78 to swing inwardly against the outer end of the pin 67 at the inspection station I so as to push that pin radially inward to its retracted position, where it subsequently will contact with the cam 66 of the bell crank lever 62 and cause latching of the wiper arm 56 to the wiper arm 33.

The circuit for actuating the solenoid 82 may include a circuit-clearing micro-switch 86 which is incorporated into the solenoid circuit through the junction box and relay mechanism 84. This switch 86 has a normally projected stem 87 and remains closed while its stem is projected. A continuously rotating cam 88 on the final drive shaft 3 has a high portion 88a extending for approximately half its circumference and a low portion 88b of approximately the same extent. A pivoted arm 89 contacts the outer end of the switch stem 87 and carries a cam-following roller 90. The arrangement preferably is such that the cam-follower will be on the high part of the cam during movement of each pocket in the carrier 4 between stations and on the low portion of the cam during the dwell of each pocket at each of the stations. Consequently, the switch 86 will be open during movement of a pocket of the carrier 4 to the inspection station I and will be closed while that pocket is at the inspection station. If the article in the pocket at the inspection station has been found to be defective because of the presence of a check in the neck finish or rim portion, the solenoid may be energized by reason of completion of the circuit in the manner described. This circuit will remain closed by reason of the relay mechanism included therein until the pocket is moved away from the inspection station, whereupon the cam-follower 90 will ride into a high portion of the cam 88 to open the switch 86 and clear the circuit.

Except for the photoelectric cell unit and cooperative light source and their electrical connections with the solenoid and particular features of the pin-actuating lever arm 78, Fig. 3, which hereinafter will be particularly pointed out, the detailed structure of the machine as described so far are substantially as are also disclosed in my aforesaid application, Serial No. 665,599.

The parts of the machine which will now be described are directed more particularly to the provisions thereof to detect spikes in the articles of glassware carried in the pockets 5 of the carrier 4 and to activate the reject mechanism hereinbefore described to eject from its pocket at the reject station R each inspected article of glassware in which a spike has been detected.

As shown in Fig. 1, the main shaft 1 projects upwardly at 1a above the rotating carrier 4. A carrier, generally designated 91, for spike-detecting mechanisms, hereinafter more particularly described, comprises a hub 92 fitting over the upper end portion 1a of the main shaft and over a coupling member 93 which is in the form of a sleeve having a flanged lower end portion 93a fastened, as by the cap bolts 94, to the hub of the article-carrier 4. The hub 92 of the carrier 91 is splined, as by the feather 95 to the coupling member so that the carrier 91 may be adjusted vertically on its supporting shaft relative to the article-carrier but will rotate in unison with the latter at all vertically adjusted positions of the carrier 91. This vertical adjustment of the carrier 91 may be effected by the following means. A cap plate 96 is provided on the upper end of the hub 92 directly above the upper end of the main shaft, this plate being fastened to the hub 92 by cap bolts 97. An additional cap bolt 98 is threaded through an opening 99 in the plate 96 against the upper end surface of the main shaft. A cooperative cap bolt 100 extends through a suitable opening 101 in the plate 96 and is screwed into a threaded socket 102 in the upper end portion of the main shaft. By suitably adjusting these cap bolts 98 and 100, the vertically adjusted position of the carrier 91 on the main shaft can be established and maintained or adjusted to suit another thickness of article bottom. Obviously several of the bolts 98 and several of the bolts 100 may be employed if desired.

The carrier 91 comprises an upper web 103 and a lower web 104. These are formed adjacent to their periphery with vertically aligned tubular bosses 105 and 106, respectively. The sets of aligned bosses 105 and 106 correspond in number and relative arrangement to the pockets 5 in the article-carrier 4. The locations of the individual sets of aligned bosses are such that the bores 107 and 108 of aligned bosses 105 and 106, respectively, are located in vertical alignment with an article 6 in the underneath pocket 5 of the carrier 4 when that article is positioned in that pocket against its article-positioning elements 8 and 9. A bushing 109 is provided in the bore 108 of each boss 106. The wall of the bore 107 of the boss 105 is threaded for engagement at 110 with an externally screw-threaded bushing 111.

A spike-detecting mechanism is provided for each set of aligned bushings 111 and 109 and comprises a vertical stem 112 slidable in these bushings and projecting above the upper bushing 111 and below the lower bushing 109. A spike feeler in the form of an article bottom contact plate or head 113 is fixed to the lower end of each stem 112. This contact plate or head preferably is only sufficiently smaller in cross-sectional dimensions than the opening 6a in the upper end of the glass article 6 to permit entry thereof into the glass article when they are aligned. Preferably, the contour of the lower surface of the head 113 will roughly approximate that of the upper surface of the bottom of the article 6 when the latter has been accurately formed and is free from defects so that there will be overall contact between these surfaces, as at 114, when the feeler head has been lowered onto the bottom of the article as shown in Fig. 1.

A collar 115 is fixed on each of the stems 112 and carries a roller 116 which rides on the upper surface of a stationary cam 117, which surrounds the carrier 91. The upper cam surface of the cam 117 includes a high portion 117a which may extend for a substantial part of the circumference of the cam. When a roller 116 is on the high part of the cam, its spike feeler will be supported above the level of the upper end of an article 6 in the underneath pocket 5. The cam 117 also includes a symmetrically curved dip in its upper surface, one of the oppositely inclined portions of which is shown at 117b in Fig. 1. When a roller 116 traverses this dip portion of the cam, its spike feeler will descend by gravity from its high position until the feeler head rests upon the bottom of the underneath article 6 and then will be raised out of the article and to its high position. The spike feeler at the left-hand side of Fig. 1 is shown at its low position while that at the right-hand side of the same view is shown raised. The cam 117 may be positioned around the rotary parts of the machine so that each spike feeler will be lowered into an article 6 in an underneath pocket 5 and raised therefrom while that pocket is en route from the loading station L, Fig. 2, to the reject station R, Figs. 2 and 3, the feeler being at the bottom of its stroke when at approximately the place or station indicated at S in Figs. 2 and 3. At this time, a vertical slot 118 in the portion of the feeler stem 112 that slides in the bushing 111, Fig. 1, will be completely beneath the upper end of that bushing if the bottom of the article 6 onto which the feeler head has been lowered is free from an upward projection or spike and is of proper thickness. If, however, descent of the feeler has been checked prematurely by an upward projection or spike on the article bottom or by any other obstruction to its full downward stroke, the slot 118 in the feeler stem will extend above the top of the bushing 111. The upper portion of the boss 105 is provided with a transverse opening 119 in line with a light source 120 and with a photoelectric cell unit 121. With this arrangement, a beam of light from the source 120 will be obstructed by the imperforate upper end portion of the feeler stem 112 when the latter is in its fully lowered position in the article 6. The slot 118 is of sufficient length to permit light from the source 120 to pass through an exposed portion of the slot above the top of the vertically adjusted bushing 111 to the photoelectric cell unit 121 as such feeler is moved past the station S if the downward stroke of the feeler has been halted prematurely at that time by any obstruction which prevents a full downward stroke of the feeler. The bushings 111 are adjusted in their bores so that all feeler mechanisms will cut off such light when full downward strokes of their feelers have been terminated by article bottoms of exactly the same thickness in the underneath carrier pockets. The whole carrier 91 of the spike-detecting mechanisms may be adjusted vertically relative to the stationary cam 117 by the screws 98 and 100 to establish this thickness. Among the obstructions which will halt the downward stroke of a feeler prematurely are an upward projection or spike which need be only of but slight extent—$\frac{1}{32}$ inch or even less—on the bottom of the article into which the feeler has descended, an excessively thick bottom on such article, or any portion of the article which because of malformation or improper positioning of the article is interposed in the path of descent of the feeler so as to prevent a full downward stroke thereof. The vertically adjusted position of the bushing 111 may be maintained by a set screw 122 or other suitable fastening device. Vertical guide rods 123 may be provided to extend between the webs 103 and 104 of the carrier 91 and the collars 115 on the feeler stems may have notched portions 124 slidably engaging these guide rods 123.

Figure 5:
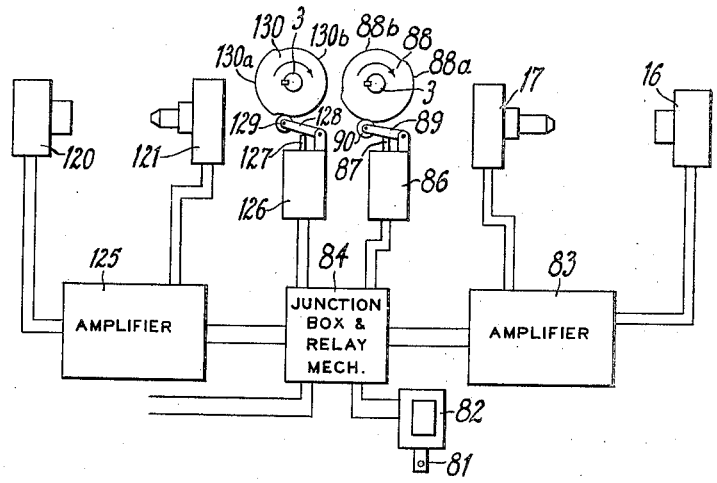
Fig. 5 is a diagram of electrical mechanisms and connections of the machine.

The photoelectric cell unit 121 and the light source 120 are shown in Fig. 5 as being connected electrically through an amplifying unit 125 and the junction box and relay mechanism 84 with the aforesaid solenoid 82. Energization of the photoelectric cell unit 121 by light passing thereto in the manner described when a spike feeler has detected a spike or upward projection on the bottom of a glass article 6 in a carrier pocket passing the place or station S may effect operation of the solenoid. It is to be noted that the solenoid-operated pin-actuating lever arm 78, Fig. 3, is of sufficient length to extend past the station S and is appropriately formed to push the pin 67 at the station S inwardly to its retracted or active position when and if that arm is swung inwardly by the solenoid from the position shown in Fig. 3. The carrier is in motion at this time. Consequently, if there is a spike or upward projection on the bottom of the article 6 into which a spike feeler has been lowered, or some other obstruction to a full downward stroke of the feeler, the solenoid may be operated to preset the reject mechanism of the machine so as to discard that particular article at the reject station R irrespective of whether or not a check should be detected in its finish or rim portion when it is subsequently inspected for checks at the station I. In order that this may be done even though the clearance switch 86 of the solenoid operating mechanism is open, a second circuit clearing micro-switch, indicated at 126, Figs. 3 and 5, is provided and is connected through the junction box and relay mechanism 84 with the solenoid 82 so as to be in parallel with the micro-switch 86. The micro-switch 126 has a normally projected plunger 127 and a pivoted actuating arm 128 at the outer end of the plunger 127. The arm 128 carries a cam-follower roll 129 in contact with a cam 130 which is mounted on the same continuously rotating shaft 3 as the cam 88 although shown in Fig. 5 out of its true position. The cam 130 is laid out to comprise a high cam surface 130a and a low cam surface 130b. The high cam surface may comprise only a minor portion of the entire periphery of the cam. When the cam-follower moves onto the high portion of the cam 130, the switch 126 will be opened. When an article in any pocket 5 of the article carrier is being moved past the station S, the cam-follower 129 will be on a low portion of cam 130 and the switch 126 will be closed. Thereafter, the high portion of the cam 130 will effect opening of the switch 126 to clear the solenoid circuit.

It may be noted that the bosses 105 on the upper web 103 of the carrier 91 are connected by arcuate segments of an upstanding flange 131 by which light from the source 120 is prevented from reaching the photoelectric cell unit 121 except through a transverse opening 119 and a slot 118 of a spike feeler by which a spike or other obstruction has been detected in an article passing the inspection station S.

Spring pressers 13 hereinbefore referred to may be located in positions to press against the article in a pocket 5 of the carrier 4 at the time a spike feeler is lowered into such article and again when the feeler head is raised through the open upper end of the glass article after completing a spike detecting stroke. This safety provision may not be required but may be desirable to assure accurate positioning of the glass article in its pocket for the spike detecting operation, particularly if the spike feeler head is only slightly smaller than the opening in the top of the article. The machine also may include a waste receptacle 132, Fig. 1, beneath the article carrier to catch any broken glassware.

In operation glass articles to be inspected may be loaded into successive pockets in the intermittently rotated carrier 4 as such pockets are presented at the loading station L. Each article then will be moved in its turn past the spike inspection station S and to the check inspection station I. During the part of the cycle of rotation of the carrier 4 that effects movement of an article in a pocket past the station S, the corresponding spike feeler will be lowered into that article against the bottom thereof. If a spike exists on the bottom of the article, or the article is defective because it provides some other obstruction to a full downward stroke of the feeler, the reject mechanism will be set to effect latching of the article-ejecting arm of the reject mechanism to the article-ejecting arm of the good ware delivery mechanism so that the defective article will be discarded at the reject station. The article may be further inspected for another defect when it has been brought to the inspection station I. The particular defect for which inspection is conducted at station I by the illustrative machine herein described is a check in its finish or rim portion but inspection might be conducted at that or some other appropriate station for some other known defect, such as out-of-roundness of the finish or rim portion of the article, or a series of inspections might be conducted for different particular defects during travel of each article from the loading station to the reject station. A single reject mechanism may be employed according to the invention and rendered active by the detection of any one of these particular defects. If no such defect is found in the article, it will be carried to the delivery station for the good ware and ejected from the machine at that place.

The machine is fully automatic and will handle and inspect glass articles in a regular succession rapidly and accurately. No additional time is required to conduct the inspection of the article for spikes in addition to that required for inspection of the article for some other defect while the article carrier is at rest as the spike inspection may be conducted during movement of the carrier between stations.

Many modifications of and changes in the illustrative embodiment of the invention shown in the drawings and herein particularly described will readily occur to those skilled in the art and I, therefore, do not wish to be limited to the details of such illustrative embodiment.

What I claim is:

1. In a glassware inspecting machine, a carrier constructed and arranged to support and transport a series of spaced jars or like glass articles along a predetermined path, a second carrier located above the first carrier and mounted to move therewith, a series of spaced spike detecting mechanisms carried by the second carrier and respectively located above the individual glass articles on the first carrier, each of said detecting mechanisms comprising a vertically disposed tubular boss on the second carrier, said boss having a transverse slot through its walls, a vertically adjustable bushing in said tubular boss normally positioned with its upper end above the bottom and below the top of said transverse slot in the boss, and a vertically movable spike feeler comprising a vertical stem extending slidably through said bushing to a level in the boss above said transverse slot and a feeler head adapted for movement through the opening in the upper end of the underneath glass article and for contact with the bottom of such article, said stem having a vertical slot extending transversely through a portion thereof that may move vertically in said bushing, means comprising a stationary cam extending along the path of movement of the carrier and cam rolls carried by the feeler stems to ride on the cam for controlling the vertical movements of said feelers to cause each to be lowered to the bottom of the underneath article at a predetermined point along said path and thereafter to be raised out of the article, the slot in the stem of each feeler projecting above the top of its bushing when the feeler is at the lower limit of its downward stroke only if such downward stroke has been halted prematurely by a spike or upward projection on the bottom of the glass article, a source of light and a photoelectric cell unit positioned adjacent to said predetermined point so that light from said source may pass, through the slot in the bushing and through the exposed portion of the feeler stem slot if its downward stroke has been halted prematurely, to the photoelectric cell unit, and means responsive to energization of said photoelectric cell unit by light from said source to remove articles from said first carrier.

2. The combination with a horizontally disposed rotary carrier provided with a series of article-accommodating pockets, each open at the periphery of the carrier, and means to rotate said carrier to present each of said pockets in turn at an article loading station, an article inspection station, a reject station and an article delivery station, of article testing means acting automatically to test each article in a pocket at said inspection station for checks in its finish or rim portion, said article testing means comprising a source of light and a photoelectric cell unit positioned cooperatively with respect to each other and to the finish or rim portion of the article at the inspection station to cause light from said source to strike the wall of the finish or rim portion of the article and to be reflected into the photoelectric cell unit to energize the latter only if such light strikes a check, an article ejecting member movable from an inactive position adjacent to the article delivery station to eject, on each working stroke thereof, an article from a carrier pocket at the delivery station, means to operate said article ejecting member to cause a working stroke thereof each time a pocket of said carrier is at the delivery station, another article ejecting member movable from an inactive position to eject, on a working stroke thereof, a defective article from a carrier pocket at the reject station, latching means operable to operatively connect the second article ejecting member with the operating means for the first article ejecting member and to disconnect it from said operating means, and means controlled by said photoelectric cell unit to operate said latching means to effect such operative connection whenever said photoelectric cell unit has been energized.

3. The combination recited in claim 2 and, in addition, a second carrier positioned above and mounted to rotate with said first carrier, a series of spike detecting mechanisms carried by said second carrier, said spike detecting mechanisms corresponding in number with said article accommodating pockets and respectively being located above said pockets, each spike detecting mechanism comprising a vertically movable feeler, means controlling movements of said feelers to cause each to be lowered into an article in the underneath pocket to the bottom of the latter at a predetermined point along the path of movement of the pocket by said first carrier and thereafter to be raised out of said article, and means comprising a source of light and a photoelectric cell unit positioned cooperatively with respect to each other and to each spike detecting mechanism when the feeler of the latter is at the lower limit of its downward stroke in an article in one of said pockets so that said last named photoelectric cell unit will be energized by light from said last named source only if the downward movement of the feeler has been halted prematurely by a spike or upward projection on the bottom of the article, and means operatively connecting said last named photoelectric cell unit with said means to operate said latching means.

4. The combination recited in claim 2 wherein said latching means comprises cooperative latching elements carried by said article ejecting members, one of said latching elements being movable into and out of engagement with the other, and wherein the means to operate said latching means comprises a rod movable in one direction to cause said movable latch element to engage the other and in the opposite direction to cause disengagement thereof, cam-actuated means to move said rod, a series of individually, radially movable pins mounted to rotate with said carrier, there being a pin for each of said pockets and each pin being adapted when at the limit of its radial movement in one direction to actuate said cam-actuated means on rotation of the carrier and to clear said cam-actuated means when at the limit of its radial movement in the opposite direction, a solenoid, means operable by energization of said photoelectric cell unit to energize the solenoid, means operable by said solenoid when it is energized to move the pin for that pocket radially to its first named position, and means to return said pin radially to its second position after its pocket has reached said reject station, and, in addition, means to test the article in each of said pockets for a spike or upward projection on its bottom, said last named means including a photoelectric cell unit arranged to be energized only if such a spike or upward projection is detected in the article undergoing test, and means operatively connecting said second photoelectric cell unit with said solenoid.

5. A machine for inspecting glass jars or like articles comprising a horizontally disposed rotary carrier provided with a series of article-accommodating pockets, each open at the periphery of the carrier, means to rotate said carrier to present each of said pockets in turn at an article loading station, a reject station and a delivery station, a second carrier located above the first carrier and mounted to rotate with the latter, a series of vertically movable spike feelers corresponding in number with pockets and respectively positioned above and in line with the individual pockets, means controlling the vertical movements of said spike feelers to cause each in its turn to descend into an article in the underlying pocket completely to the bottom of said article at a predetermined point along the path of movement of the pocket between said loading station and said reject station unless the descent of said feeler is stopped at a slightly higher level by a spike or upward projection on the bottom of the article and thereafter to raise said feeler completely out of said article, means to remove articles from the pockets arriving at the delivery station, normally inactive means operable when activated to remove articles from the pockets when they are at the reject station, control means comprising a photoelectric cell unit and a source of light in relatively fixed cooperative positions adjacent to the point along the path of travel of said series of spike feelers at which each feeler descends into an underneath article, said feeler being constructed and arranged to permit light from said source to reach the photoelectric cell unit at that point if the feeler has been halted on its downward stroke by a spike or upward projection on the bottom of the article and to prevent passage of such light to the photoelectric cell unit under all other conditions, and means responsive to energization of said photoelectric cell unit by light from said source to activate said normally inactive means to remove said article from its pocket when that pocket arrives at the reject station and, in addition, a second control means comprising a second source of light positioned to direct a beam of light against a wall of each article in a pocket of the first carrier at another station intermediate the loading station and the reject station, a second photoelectric cell unit located adjacent to said last named station in a position so related to said last named beam of light at the place at which it strikes said wall of the article that said beam will be reflected by a check in said wall into the photoelectric cell unit and will pass by the latter if no check exists, and means responsive to energization of the second photoelectric cell unit by reflected light to activate said normally inactive means to remove the article containing said check from its pocket when said pocket arrives at said reject station.

EDWARD H. LORENZ.

REFERENCES CITED

The following references are of record in the file of this patent:

UNITED STATES PATENTS

| Number | Name | Date |
| --- | --- | --- |
| 1,586,155 | Keller | May 25, 1926 |
| 1,756,785 | Gallasch | Apr. 29, 1930 |
| 2,318,856 | Hoffman | May 11, 1943 |
| 2,338,868 | Owens | Jan. 11, 1944 |
| 2,353,758 | Peck | July 18, 1944 |
| 2,407,062 | Darrah | Sept. 3, 1946 |
| 2,410,093 | Martinec | Oct. 29, 1946 |

FOREIGN PATENTS

| Number | Country | Date |
| --- | --- | --- |
| 304,652 | Germany | Mar. 25, 1918 |